(12) United States Patent
Lee et al.

(10) Patent No.: US 9,668,278 B2
(45) Date of Patent: May 30, 2017

(54) METHOD AND APPARATUS FOR TRANSMITTING INDICATION IN WIRELESS COMMUNICATION SYSTEM

(71) Applicant: LG ELECTRONICS INC., Seoul (KR)

(72) Inventors: Youngdae Lee, Seoul (KR); Sungjun Park, Seoul (KR); Seungjune Yi, Seoul (KR); Sunghoon Jung, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 14/414,015

(22) PCT Filed: Jul. 22, 2013

(86) PCT No.: PCT/KR2013/006530
§ 371 (c)(1),
(2) Date: Jan. 9, 2015

(87) PCT Pub. No.: WO2014/014323
PCT Pub. Date: Jan. 23, 2014

(65) Prior Publication Data
US 2015/0195865 A1     Jul. 9, 2015

Related U.S. Application Data

(60) Provisional application No. 61/673,739, filed on Jul. 20, 2012.

(51) Int. Cl.
*H04W 4/00* (2009.01)
*H04W 72/14* (2009.01)
(Continued)

(52) U.S. Cl.
CPC ............ *H04W 72/14* (2013.01); *H04W 8/005* (2013.01); *H04W 8/14* (2013.01); *H04W 8/24* (2013.01);
(Continued)

(58) Field of Classification Search
CPC ... H04W 76/043; H04W 24/08; H04W 72/14; H04W 76/023; H04W 8/24;
(Continued)

(56) References Cited

U.S. PATENT DOCUMENTS

2007/0097926 A1   5/2007   Liu et al.
2007/0258402 A1   11/2007  Nakamata et al.
(Continued)

FOREIGN PATENT DOCUMENTS

CN    102365897 A    2/2012
EP    2 773 129 A1   9/2014
(Continued)

OTHER PUBLICATIONS

Patrick Marsch et al. "Future Mobile Communication Networks: Challenges in the Design and Operation",Vehicular Technology Magazine, IEE, vol. 7, Issue 1, pp. 16-23, Jan. 2012 in further view of Lee et al. (WO 2011/109027).*
(Continued)

*Primary Examiner* — Tanmay Shah
(74) *Attorney, Agent, or Firm* — Birch, Stewart, Kolasch & Birch, LLP

(57) ABSTRACT

A method and apparatus for transmitting an indication for device-to-device (D2D) mobility or D2D connection failure in a wireless communication system is provided. A first mobile device identifies a cell for mobility of the first mobile device or a second mobile device which has a connection with the first mobile device, and indicates the connection with the second mobile device to the cell. Also, the first mobile device detects failure of the connection with the second mobile device, and indicates the failure of the connection with the second mobile device to either the second mobile device or the cell.

11 Claims, 12 Drawing Sheets

(51) Int. Cl.

| | | |
|---|---|---|
| *H04W 76/04* | (2009.01) | |
| *H04W 36/00* | (2009.01) | |
| *H04W 8/00* | (2009.01) | |
| *H04W 60/04* | (2009.01) | |
| *H04W 68/02* | (2009.01) | |
| *H04W 8/14* | (2009.01) | |
| *H04W 76/02* | (2009.01) | |
| *H04W 8/24* | (2009.01) | |
| *H04W 24/08* | (2009.01) | |
| *H04W 72/04* | (2009.01) | |
| *H04W 88/06* | (2009.01) | |
| *H04W 24/10* | (2009.01) | |
| *H04W 92/18* | (2009.01) | |

(52) U.S. Cl.
CPC ....... *H04W 24/08* (2013.01); *H04W 36/0061* (2013.01); *H04W 60/04* (2013.01); *H04W 68/02* (2013.01); *H04W 72/042* (2013.01); *H04W 76/023* (2013.01); *H04W 76/027* (2013.01); *H04W 76/043* (2013.01); *H04W 76/046* (2013.01); *H04W 76/048* (2013.01); *H04W 24/10* (2013.01); *H04W 76/021* (2013.01); *H04W 88/06* (2013.01); *H04W 92/18* (2013.01)

(58) Field of Classification Search
CPC ... H04W 76/046; H04W 76/027; H04W 8/14; H04W 68/02; H04W 60/04; H04W 8/005; H04W 36/0061; H04W 24/10; H04W 92/18; H04W 76/021; H04W 88/06
USPC .................................................. 455/426.1
See application file for complete search history.

(56) References Cited

U.S. PATENT DOCUMENTS

| | | | |
|---|---|---|---|
| 2009/0316633 A1 | 12/2009 | Kato et al. | |
| 2010/0240312 A1 | 9/2010 | Peng et al. | |
| 2010/0261469 A1* | 10/2010 | Ribeiro | H04W 99/00 455/423 |
| 2010/0279695 A1 | 11/2010 | Amirijoo et al. | |
| 2011/0261747 A1 | 10/2011 | Wang et al. | |
| 2011/0312331 A1 | 12/2011 | Hakola et al. | |
| 2012/0020231 A1 | 1/2012 | Chen et al. | |
| 2012/0163235 A1 | 6/2012 | Ho et al. | |
| 2013/0064103 A1 | 3/2013 | Koskela et al. | |
| 2013/0107722 A1 | 5/2013 | Huang | |
| 2013/0107782 A1 | 5/2013 | Anas et al. | |
| 2013/0156000 A1 | 6/2013 | Hwang | |
| 2013/0170387 A1 | 7/2013 | Wang et al. | |
| 2013/0208641 A1 | 8/2013 | Baghel et al. | |
| 2013/0272294 A1 | 10/2013 | Mildh et al. | |
| 2013/0322277 A1 | 12/2013 | Vanganuru et al. | |
| 2013/0329711 A1 | 12/2013 | Seo et al. | |
| 2014/0036718 A1 | 2/2014 | Gao et al. | |
| 2014/0200016 A1 | 7/2014 | Siomina et al. | |
| 2014/0335875 A1 | 11/2014 | Li et al. | |
| 2015/0156757 A1 | 6/2015 | Kalhan | |
| 2015/0304969 A1 | 10/2015 | Morita et al. | |

FOREIGN PATENT DOCUMENTS

| | | | | |
|---|---|---|---|---|
| FI | WO 2011109027 A1 * | 9/2011 | ........ | H04W 36/0072 |
| JP | 2014-504814 A | 2/2014 | | |
| KR | WO 2012091420 A2 * | 7/2012 | .......... | H04W 76/023 |
| WO | WO 2011/109027 A1 | 9/2011 | | |
| WO | WO 2012/088470 A1 | 6/2012 | | |
| WO | WO 2012/091420 A2 | 7/2012 | | |
| WO | WO 2012/144320 A1 | 10/2012 | | |

OTHER PUBLICATIONS

Marsch et al. "Future Mobile Communication Networks: Challenges in the Design and Operation", IEEE Vehicular Technology Magazine, vol. 7, Issue 1, pp. 16-23, Jan. 27, 2012.

Fodor et al., "Design Aspects of Network Assisted Device-to-Device Communications, " IEEE Communications Magazine, Mar. 2012, pp. 170-177.

Intel Corporation, "Suggested D2D Terminologies (Operator Managed, Operator Assisted, Operator Free), " 3GPP TSG-SA WG1 Meeting #57, S1-120059, Kyoto, Japan, Feb. 13-17, 2012, 3 pages.

* cited by examiner

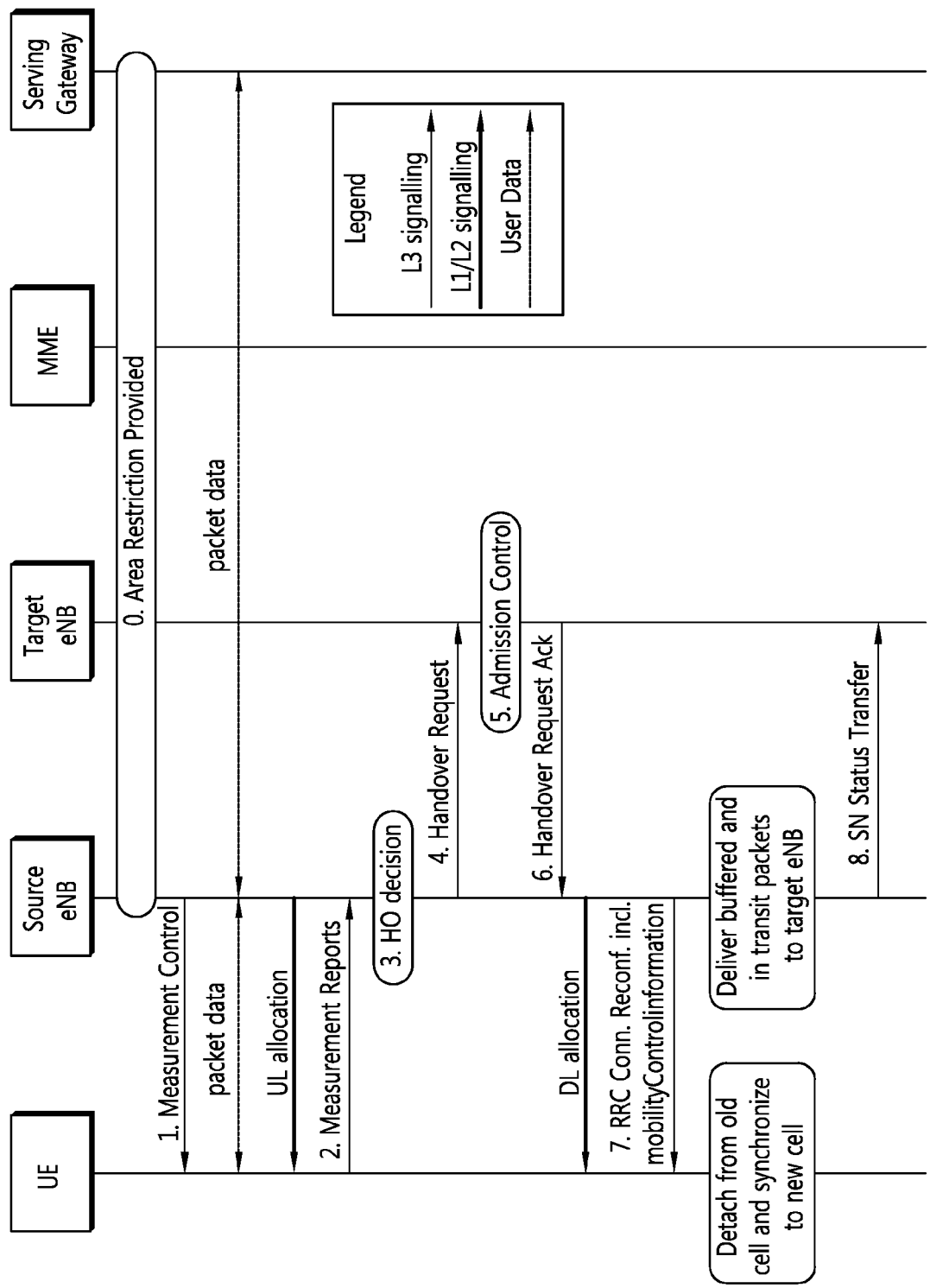

METHOD AND APPARATUS FOR TRANSMITTING INDICATION IN WIRELESS COMMUNICATION SYSTEM

CROSS REFERENCE TO RELATED APPLICATIONS

This application is the National Phase of PCT/KR2013/006530 filed on Jul. 22, 2013, which claims priority under 35 U.S.C. 119(e) to U.S. Provisional Application No. 61/673,739 filed on Jul. 20, 2012, all of which are hereby expressly incorporated by reference into the present application.

TECHNICAL FIELD

The present invention relates to wireless communications, and more particularly, to a method and apparatus for transmitting an indication in a wireless communication system.

BACKGROUND ART

Universal mobile telecommunications system (UMTS) is a 3rd generation (3G) asynchronous mobile communication system operating in wideband code division multiple access (WCDMA) based on European systems, global system for mobile communications (GSM) and general packet radio services (GPRS). A long-term evolution (LTE) of UMTS is under discussion by the 3rd generation partnership project (3GPP) that standardized UMTS.

With the advent of a ubiquitous environment, there is a rapid increase in a demand for receiving a seamless service anytime anywhere by using equipments. In order to satisfy such a demand, a device-to-device (D2D) connection technique may be introduced in a wireless communication system. The D2D connection technique refers to a technique for transmitting and receiving data not via a base station (BS) since devices such as a user equipment (UE) or the like are connected to each other. That is, one device can communicate with another device via the BS, and can directly communicate with another device not via the BS. By using the D2D connection technique, such an effect as low power consumption, throughput enhancement, etc., can be obtained.

How a network and UEs should operate for D2D connection should be specified.

SUMMARY OF INVENTION

Technical Problem

The present invention provides a method and apparatus for transmitting an indication in a wireless communication system. The present invention provides a method for supporting mobility of a device-to-device (D2D) connection. The present invention also provides a method for releasing a D2D connection. The present invention provides a method for handling failure of a D2D connection.

Solution to Problem

In an aspect, a method for transmitting, by a first mobile device, an indication in a wireless communication system is provided. The method includes identifying a cell for mobility of the first mobile device or a second mobile device which has a connection with the first mobile device, and indicating the connection with the second mobile device to the cell.

The cell for mobility may be identified by a handover command.

The handover command may be received from a target eNodeB (eNB), which controls the cell, via a serving eNB and the second mobile device.

The connection with the second mobile device may be indicated by an establishment cause in a radio resource control (RRC) connection request message or an RRC connection setup complete message.

The RRC connection request message or the RRC connection setup complete message may include an identity of the first mobile device.

The method may further include receiving a D2D measurement configuration from the second mobile device, and transmitting a D2D measurement report to the second mobile device.

The method may further include transmitting a D2D connection release request message, including information on the cell for mobility and the connection with the second mobile device, to the second mobile device.

The method may further include receiving a D2D connection release message, including redirection information indicating redirected carrier frequency or redirected cell, from the second mobile device.

In another aspect, a method for transmitting, by a first mobile device, an indication in a wireless communication system is provided. The method includes detecting failure of a connection with a second mobile device, and indicating the failure of the connection with the second mobile device to either the second mobile device or a cell.

The failure of the connection with the second mobile device may be indicated by an establishment cause in a radio resource control (RRC) connection request message or an RRC connection reestablishment request message.

The RRC connection request message or the RRC connection reestablishment request message may include an identity of the first mobile device.

The method may further include transmitting an RRC connection setup complete message or an RRC connection reestablishment complete message.

The RRC connection setup complete message or the RRC connection reestablishment complete message may include an identity of the second mobile device and an identity of a cell of the first mobile device.

Advantageous Effects of Invention

Mobility and connection failure for D2D connection can be handled efficiently.

BRIEF DESCRIPTION OF DRAWINGS

FIGS. 9a and 9b shows an example of an intra-MME/S-GW handover procedure.

MODE FOR THE INVENTION

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802.20, evolved UTRA (E-UTRA), etc. IEEE 802.16m is evolved from IEEE 802.16e, and provides backward compatibility with a system based on the IEEE 802.16e. The UTRA is a part of a universal mobile telecommunication system (UMTS). $3^{rd}$ generation partnership project (3GPP) long term evolution (LTE) is a part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

For clarity, the following description will focus on LTE-A. However, technical features of the present invention are not limited thereto.

Figure 1:
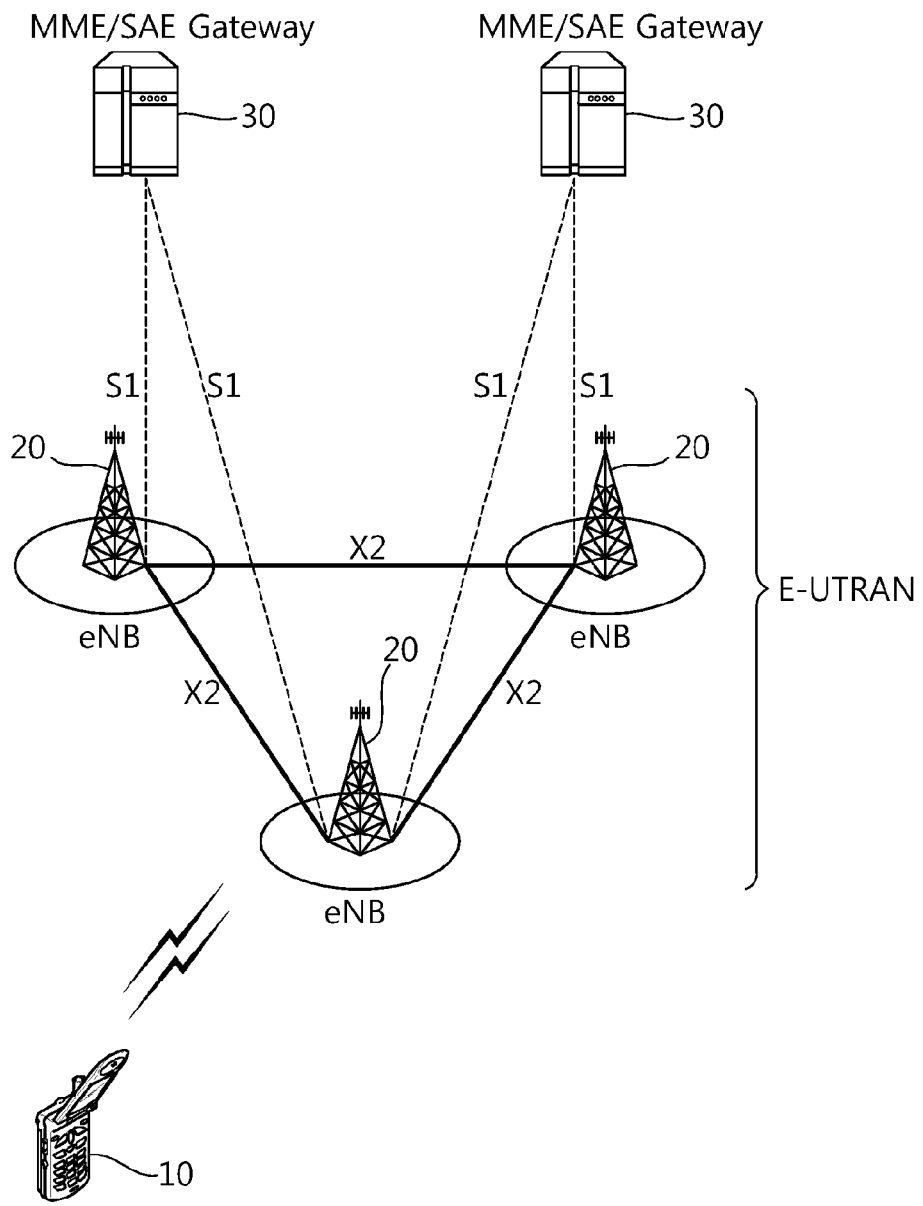
FIG. 1 shows a structure of a wireless communication system.

FIG. 1 shows a structure of a wireless communication system.

The structure of FIG. 1 is an example of a network structure of an evolved-UMTS terrestrial radio access network (E-UTRAN). An E-UTRAN system may be a 3GPP LTE/LTE-A system. An evolved-UMTS terrestrial radio access network (E-UTRAN) includes a user equipment (UE) 10 and a base station (BS) 20 which provides a control plane and a user plane to the UE. The user equipment (UE) 10 may be fixed or mobile, and may be referred to as another terminology, such as a mobile station (MS), a user terminal (UT), a subscriber station (SS), a wireless device, etc. The BS 20 is generally a fixed station that communicates with the UE 10 and may be referred to as another terminology, such as an evolved node-B (eNB), a base transceiver system (BTS), an access point, etc. There are one or more cells within the coverage of the BS 20. A single cell is configured to have one of bandwidths selected from 1.25, 2.5, 5, 10, and 20 MHz, etc., and provides downlink or uplink transmission services to several UEs. In this case, different cells can be configured to provide different bandwidths.

Interfaces for transmitting user traffic or control traffic may be used between the BSs 20. The BSs 20 are interconnected by means of an X2 interface. The BSs 20 are connected to an evolved packet core (EPC) by means of an S1 interface. The EPC may consist of a mobility management entity (MME) 30, a serving gateway (S-GW), and a packet data network (PDN) gateway (PDN-GW). The MME has UE access information or UE capability information, and such information may be primarily used in UE mobility management. The S-GW is a gateway of which an endpoint is an E-UTRAN. The PDN-GW is a gateway of which an endpoint is a PDN. The BSs 20 are connected to the MME 30 by means of an S1-MME, and are connected to the S-GW by means of S1-U. The S1 interface supports a many-to-many relation between the BS 20 and the MME/S-GW 30.

Hereinafter, a downlink (DL) denotes communication from the BS 20 to the UE 10, and an uplink (UL) denotes communication from the UE 10 to the BS 20. In the DL, a transmitter may be a part of the BS 20, and a receiver may be a part of the UE 10. In the UL, the transmitter may be a part of the UE 10, and the receiver may be a part of the BS 20.

Figure 2:
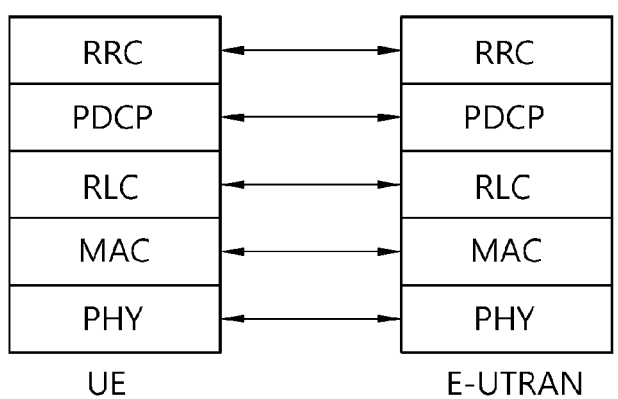
FIG. 2 is a diagram showing radio interface protocol architecture for a control plane.
Figure 3:
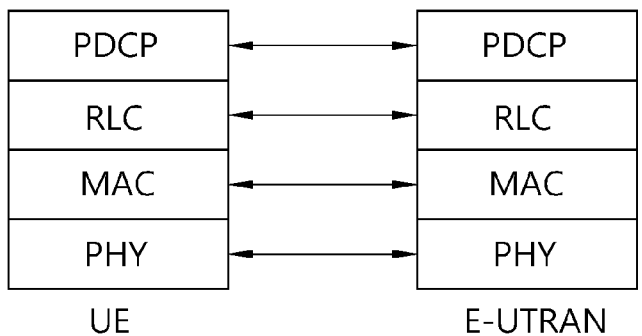
FIG. 3 is a diagram showing radio interface protocol architecture for a user plane.

FIG. 2 is a diagram showing radio interface protocol architecture for a control plane. FIG. 3 is a diagram showing radio interface protocol architecture for a user plane.

Layers of a radio interface protocol between the UE and the E-UTRAN can be classified into a first layer (L1), a second layer (L2), and a third layer (L3) based on the lower three layers of the open system interconnection (OSI) model that is well-known in the communication system. The radio interface protocol between the UE and the E-UTRAN can be horizontally divided into a physical layer, a data link layer, and a network layer, and can be vertically divided into a control plane which is a protocol stack for control signal transmission and a user plane which is a protocol stack for data information transmission. The layers of the radio interface protocol exist in pairs at the UE and the E-UTRAN.

A physical (PHY) layer belonging to the L1 provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transmitted through a radio interface. Between different PHY layers, i.e., a PHY layer of a transmitter and a PHY layer of a receiver, data is transferred through the physical channel. The physical channel is modulated using an orthogonal frequency division multiplexing (OFDM) scheme, and utilizes time and frequency as a radio resource.

The PHY layer uses several physical control channels. A physical downlink control channel (PDCCH) reports to a UE about resource allocation of a paging channel (PCH) and a downlink shared channel (DL-SCH), and hybrid automatic repeat request (HARQ) information related to the DL-SCH. The PDCCH can carry a UL grant for reporting to the UE about resource allocation of UL transmission. A physical control format indicator channel (PCFICH) reports the number of OFDM symbols used for PDCCHs to the UE, and is transmitted in every subframe. A physical hybrid ARQ indicator channel (PHICH) carries an HARQ ACK/NACK signal in response to UL transmission. A physical uplink control channel (PUCCH) carries UL control information such as HARQ ACK/NACK for DL transmission, scheduling request, and CQI. A physical uplink shared channel (PUSCH) carries a UL-uplink shared channel (SCH).

Figure 4:
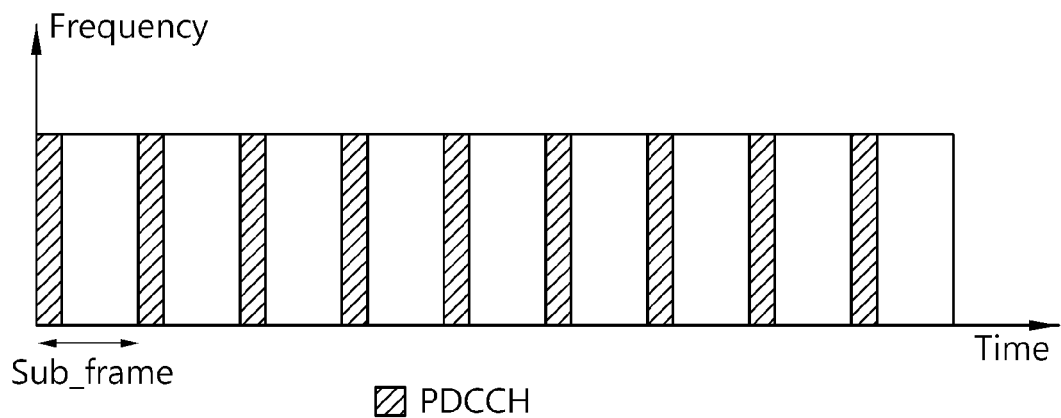
FIG. 4 shows an example of a physical channel structure.

FIG. 4 shows an example of a physical channel structure.

A physical channel consists of a plurality of subframes in a time domain and a plurality of subcarriers in a frequency domain. One subframe consists of a plurality of symbols in the time domain. One subframe consists of a plurality of resource blocks (RBs). One RB consists of a plurality of symbols and a plurality of subcarriers. In addition, each subframe can use specific subcarriers of specific symbols of a corresponding subframe for a PDCCH. For example, a first symbol of the subframe can be used for the PDCCH. A transmission time interval (TTI) which is a unit time for data transmission may be equal to a length of one subframe.

A DL transport channel for transmitting data from the network to the UE includes a broadcast channel (BCH) for transmitting system information, a paging channel (PCH) for transmitting a paging message, a DL-SCH for transmitting user traffic or control signals, etc. The system information carries one or more system information blocks. All system information blocks can be transmitted with the same periodicity. Traffic or control signals of a multimedia broadcast/multicast service (MBMS) are transmitted through a multicast channel (MCH). Meanwhile, a UL transport channel for transmitting data from the UE to the network includes a random access channel (RACH) for transmitting an initial control message, a UL-SCH for transmitting user traffic or control signals, etc.

A MAC layer belonging to the L2 provides a service to a higher layer, i.e., a radio link control (RLC), through a logical channel. A function of the MAC layer includes mapping between the logical channel and the transport channel and multiplexing/de-multiplexing for a transport block provided to a physical channel on a transport channel of a MAC service data unit (SDU) belonging to the logical channel. The logical channel is located above the transport channel, and is mapped to the transport channel. The logical channel can be divided into a control channel for delivering control region information and a traffic channel for delivering user region information. The logical includes a broadcast control channel (BCCH), a paging control channel (PCCH), a common control channel (CCCH), a multicast control channel (MCCH), a multicast traffic channel (MTCH), etc.

An RLC layer belonging to the L2 supports reliable data transmission. A function of the RLC layer includes RLC SDU concatenation, segmentation, and reassembly. To ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides error correction by using an automatic repeat request (ARQ). Meanwhile, a function of the RLC layer can be implemented with a functional block inside the MAC layer. In this case, the RLC layer may not exist.

A packet data convergence protocol (PDCP) layer belongs to the L2. A function of a packet data convergence protocol (PDCP) layer in the user plane includes user data delivery, header compression, and ciphering. The header compression has a function for decreasing a size of an IP packet header which contains relatively large-sized and unnecessary control information, to support effective transmission in a radio section having a narrow bandwidth. A function of a PDCP layer in the control plane includes control-plane data delivery and ciphering/integrity protection.

A radio resource control (RRC) layer belonging to the L3 is defined only in the control plane. The RRC layer takes a role of controlling a radio resource between the UE and the network. For this, the UE and the network exchange an RRC message through the RRC layer. The RRC layer serves to control the logical channel, the transport channel, and the physical channel in association with configuration, reconfiguration, and release of RBs. An RB is a logical path provided by the L2 for data delivery between the UE and the network. The configuration of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

A radio resource state (RRC) state indicates whether an RRC of a user equipment (UE) is logically connected to an RRC of a network. When an RRC connection is established between an RRC layer of the UE and an RRC layer of the network, the UE is in an RRC connected state (RRC_CONNECTED), and otherwise the UE is in an RRC idle state (RRC_IDLE). Since the UE in the RRC_CONNECTED has the RRC connection established with the network, the network can recognize the existence of the UE in the RRC_CONNECTED and can effectively control the UE. Meanwhile, the UE in the RRC_IDLE cannot be recognized by the network, and a core network (CN) manages the UE in unit of a tracking area (TA) which is a larger area than a cell. That is, only the existence of the UE in the RRC_IDLE is recognized in unit of a large area, and the UE must transition to the RRC_CONNECTED to receive a typical mobile communication service such as voice or data communication.

When the user initially powers on the UE, the UE first searches for a proper cell and then remains in the RRC_IDLE in the cell. When there is a need to establish an RRC connection, the UE which remains in the RRC_IDLE may establish the RRC connection with the RRC of the network through an RRC connection procedure and then may transition to the RRC_CONNECTED. The UE which remains in the RRC_IDLE may need to establish the RRC connection with the network when uplink data transmission is necessary due to a user's call attempt or the like or when there is a need to transmit a response message upon receiving a paging message from the network.

A non-access stratum (NAS) layer belongs to an upper layer of the RRC layer and serves to perform session management, mobility management, or the like. To manage mobility of the UE in the NAS layer, two states, i.e., an EPS mobility management (EMM)-REGISTERED state and an EMM-DEREGISTERED state, can be defined. The two states are applicable to the UE and the MME. The UE is initially in the EMM-DEREGISTERED. To access the network, the UE may perform a process of registering to the network through an initial attach procedure. If the initial attach procedure is successfully performed, the UE and the MME may be in the EMM-REGISTERED.

In addition, to manage a signaling connection between the UE and the EPC, two states, i.e., an EPS connection management (ECM)-IDLE state and an ECM-CONNECTED state, can be defined. The two states are applicable to the UE and the MME. When the UE in the ECM-IDLE establishes an RRC connection with the E-UTRAN, the UE may be in the ECM-CONNECTED. When the MME in the ECM-IDLE establishes an S1 connection with the E-UTRAN, the MME may be in the ECM-CONNECTED. When the UE is in the ECM-IDLE, the E-UTRAN does not have information on the context of the UE. Therefore, the UE in the ECM-IDLE can perform a UE-based mobility related procedure such as cell selection or cell reselection without having to receive a command of the network. If a location of the UE in the ECM-IDLE becomes different from a location known to the network, the UE may report the location of the UE to the network through a tracking area update procedure. On the other hand, the mobility of the UE in the ECM-CONNECTED may be managed by the command of the network.

Figure 5:
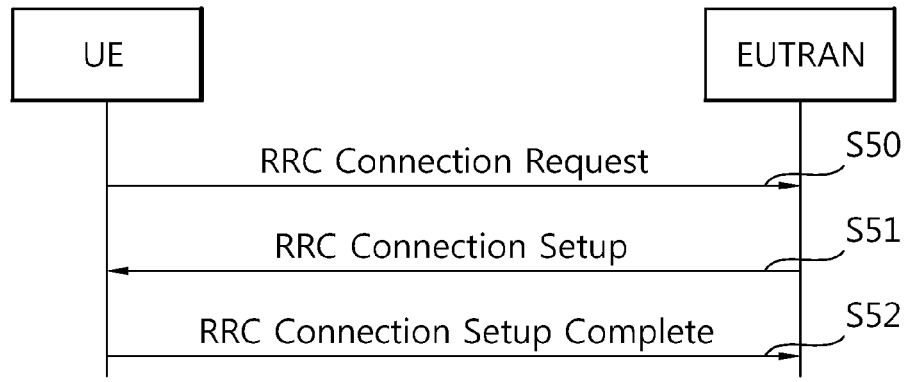
FIG. 5 shows an RRC connection establishment procedure.

FIG. 5 shows an RRC connection establishment procedure. It may be referred to Section 5.3.3 of 3GPP TS 36.331 V10.5.0 (2012-03). The purpose of this procedure is to establish an RRC connection. The RRC connection establishment may involve SRB1 establishment. The RRC connection establishment procedure is also used to transfer the initial NAS dedicated rmation/message from the UE to the E-UTRAN. The E-UTRAN may apply the RRC connection establishment procedure to establish SRB1 only.

Referring to FIG. 5, at step S50, the UE transmits an RRC connection request (RRCConnectionRequest) message to the E-UTRAN. At step S51, the E-UTRAN transmits an RRC connection setup (RRCConnectionSetup) message to the UE. At step S52, the UE transmits an RRC connection setup complete (RRCConnectionSetupComplete) message to the E-UTRAN.

Figure 6:
FIG. 6 shows an initial security activation procedure.

FIG. 6 shows an initial security activation procedure. It may be referred to Section 5.3.4 of 3GPP TS 36.331 V10.5.0 (2012-03). The purpose of this procedure is to activate access stratum (AS) security upon RRC connection establishment.

Referring to FIG. 6, at step S60, the E-UTRAN transmits a security mode command (SecurityModeCommand) message to the UE. At step S61, the UE transmits a security mode complete (SecurityModeComplete) message to the E-UTRAN.

Figure 7:
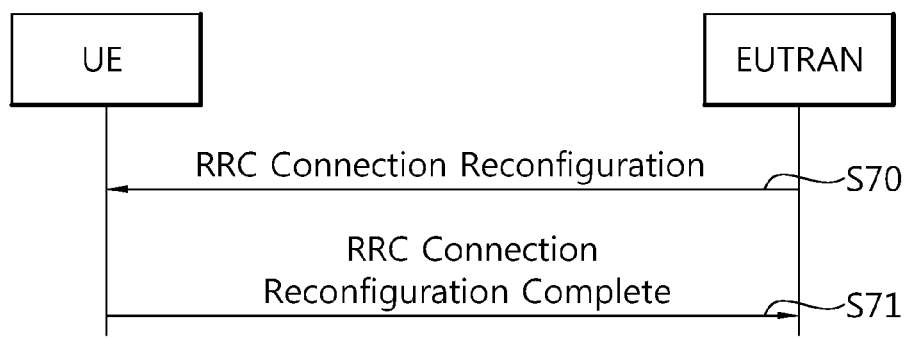
FIG. 7 shows an RRC connection reconfiguration procedure.

FIG. 7 shows an RRC connection reconfiguration procedure. It may be referred to Section 5.3.5 of 3GPP TS 36.331 V10.5.0 (2012-03). The purpose of this procedure is to modify an RRC connection, e.g. to establish/modify/release RBs, to perform handover, to setup/modify/release measurements, to add/modify/release secondary cells (SCells). As part of the RRC connection reconfiguration procedure, NAS dedicated rmation may be transferred from the E-UTRAN to the UE.

Referring to FIG. 7, at step S70, the E-UTRAN transmits an RRC connection reconfiguration (RRCConnectionReconfiguration) message to the UE. At step S71, the UE transmits an RRC connection reconfiguration complete (RRCConnectionReconfigurationComplete) message to the E-UTRAN.

Figure 8:
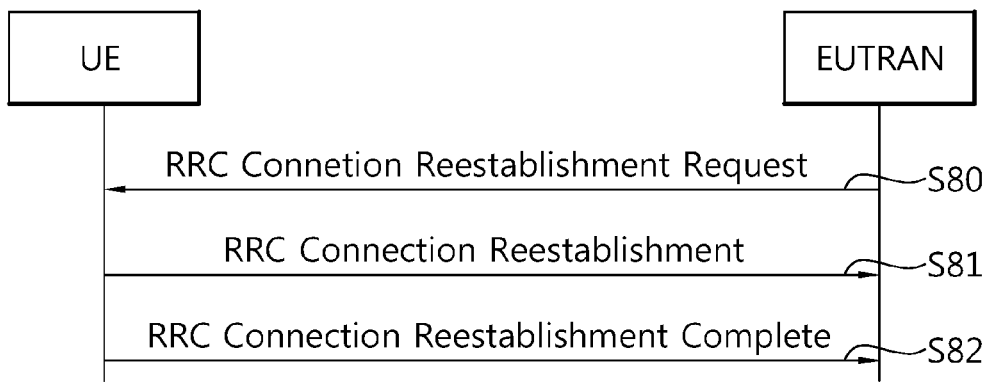
FIG. 8 shows an RRC connection re-establishment procedure.

FIG. 8 shows an RRC connection re-establishment procedure. It may be referred to Section 5.3.7 of 3GPP TS 36.331 V10.5.0 (2012-03). The purpose of this procedure is to re-establish the RRC connection, which involves the resumption of SRB1 operation, the re-activation of security and the configuration of only a primary cell (PCell). A UE in RRC_CONNECTED, for which security has been activated, may initiate the RRC connection re-establishment procedure in order to continue the RRC connection. The RRC connection re-establishment succeeds only if the concerned cell is prepared i.e. has a valid UE context. In case the E-UTRAN accepts the re-establishment, SRB1 operation resumes while the operation of other radio bearers remains suspended. If AS security has not been activated, the UE does not initiate the RRC connection reestablishment procedure but instead moves to RRC_IDLE directly. The E-UTRAN applies the procedure to reconfigure SRB1 and to resume data transfer only for this RB, and to re-activate AS security without changing algorithms.

Referring to FIG. 8, at step S80, the UE transmits an RRC connection reestablishment request (RRCConnectionReestablishmentRequest) message to the E-UTRAN. At step S81, the E-UTRAN transmits an RRC connection re-establishment (RRCConnectionReestablishment) message to the UE. At step S82, the UE transmits an RRC connection re-establishment complete (RRCConnectionReestablishmentComplete) message to the E-UTRAN.

Figure 9B:
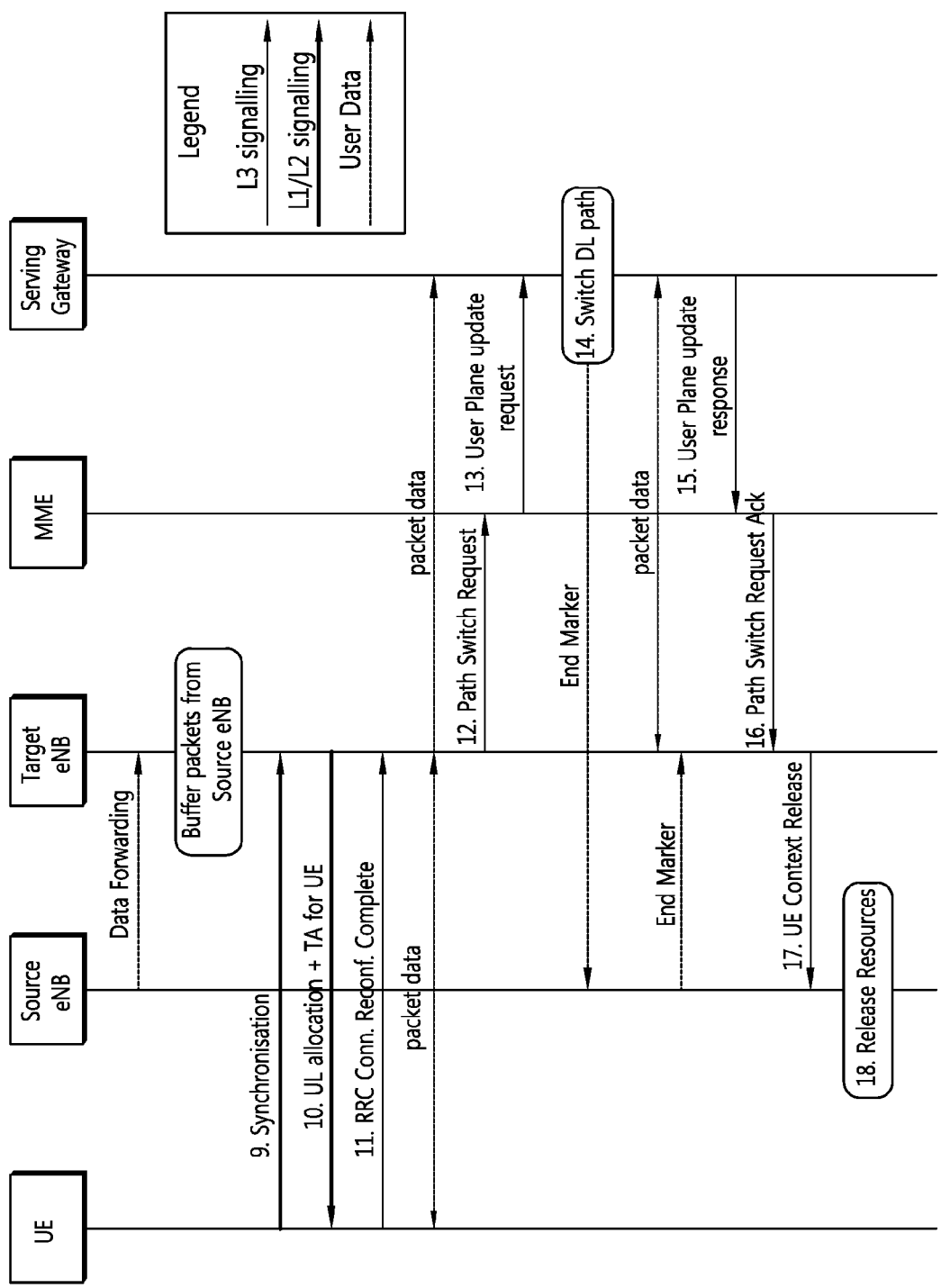

FIGS. 9a and 9b shows an example of an intra-MME/S-GW handover procedure.

The intra E-UTRAN handover of a UE in RRC_CONNECTED is a UE-assisted network-controlled handover, with handover preparation signaling in the E-UTRAN. Part of the handover command comes from the target eNB and is transparently forwarded to the UE by the source eNB. To prepare the handover, the source eNB passes all necessary information to the target eNB (e.g. E-RAB attributes and RRC context). When a carrier aggregation (CA) is configured and to enable secondary cell (SCell) selection in the target eNB, the source eNB can provide in decreasing order of radio quality a list of the best cells. Both the source eNB and the UE keep some context (e.g. cell radio network temporary identifier (C-RNTI)) to enable the return of the UE in case of handover failure. The UE accesses the target cell via a random access channel (RACH) following a contention-free procedure using a dedicated RACH preamble or following a contention-based procedure if dedicated RACH preambles are not available. The UE uses the dedicated preamble until the handover procedure is finished (successfully or unsuccessfully). If the RACH procedure towards the target cell is not successful within a certain time, the UE initiates radio link failure recovery using the best cell. No robust header compression (ROHC) context is transferred at handover.

The preparation and execution phase of the handover is performed without EPC involvement, i.e. preparation messages are directly exchanged between the eNBs. The release of the resources at the source side during the handover completion phase is triggered by the eNB.

First, the handover preparation procedure is described.

0. The UE context within the source eNB contains information regarding roaming restrictions which were provided either at connection establishment or at the last timing advance (TA) update.

1. The source eNB configures the UE measurement procedures according to the area restriction information. Measurements provided by the source eNB may assist the function controlling the UE's connection mobility.

2. The UE is triggered to transmit measurement reports by the rules set by i.e. system information, specification, etc.

3. The source eNB makes handover decision based on the measurement reports and radio resource management (RRM) information to hand off the UE.

4. The source eNB issues a handover request message to the target eNB passing necessary information to prepare the handover at the target side. UE X2/UE S1 signaling references enable the target eNB to address the source eNB and the EPC. The evolved radio access bearer (E-RAB) context includes necessary radio network layer (RNL) and transport network layer (TNL) addressing information, and quality of service (QoS) profiles of the E-RABs.

5. Admission control may be performed by the target eNB dependent on the received E-RAB QoS information to increase the likelihood of a successful handover, if the resources can be granted by target eNB. The target eNB configures the required resources according to the received E-RAB QoS information and reserves a C-RNTI and optionally a RACH preamble. The AS-configuration to be used in the target cell can either be specified independently (i.e. an "establishment") or as a delta compared to the AS-configuration used in the source cell (i.e. a "reconfiguration").

6. The target eNB prepares the handover with L1/L2 and transmits a handover request acknowledge message to the source eNB. The handover request acknowledge message includes a transparent container to be sent to the UE as an RRC message to perform the handover. The container includes a new C-RNTI, target eNB security algorithm identifiers for the selected security algorithms, may include a dedicated RACH preamble, and possibly some other parameters, i.e. access parameters, SIBs, etc. The handover request acknowledge message may also include RNL/TNL information for the forwarding tunnels, if necessary.

As soon as the source eNB receives the handover request acknowledge message, or as soon as the transmission of the handover command is initiated in the downlink, data forwarding may be initiated.

Steps 7 to 16 below provide means to avoid data loss during the handover.

7. The target eNB generates an RRC message to perform the handover, i.e. RRC connection reconfiguration (RRCConnectionReconfiguration) message including mobility control information (mobilityControlInformation), to be sent by the source eNB towards the UE. The source eNB performs the necessary integrity protection and ciphering of the message. The UE receives the RRCConnectionReconfiguration message with necessary parameters (i.e. new C-RNTI, target eNB security algorithm identifiers, and optionally dedicated RACH preamble, target eNB SIBs, etc.) and is commanded by the source eNB to perform the handover. The UE does not need to delay the handover execution for delivering the hybrid automatic repeat request (HARQ)/automatic repeat request (ARQ) responses to the source eNB.

Hereafter, the handover execution procedure will be described.

8. The source eNB transmits a serial number (SN) status transfer message to the target eNB to convey the uplink packet data convergence protocol (PDCP) SN receiver status and the downlink PDCP SN transmitter status of E-RABs for which PDCP status preservation applies (i.e. for RLC AM). The uplink PDCP SN receiver status may include at least the PDCP SN of the first missing UL SDU and a bit map of the receive status of the out of sequence UL SDUs that the UE needs to retransmit in the target cell, if there are any such SDUs. The downlink PDCP SN transmitter status indicates the next PDCP SN that the target eNB shall assign to new SDUs, not having a PDCP SN yet. The source eNB may omit transmitting this message if none of the E-RABs of the UE shall be treated with PDCP status preservation.

9. After receiving the RRCConnectionReconfiguration message including the mobilityControlInformation, the UE performs synchronization to the target eNB and access the target cell via the RACH, following a contention-free procedure if a dedicated RACH preamble was indicated in the mobilityControlInformation, or following a contention-based procedure if no dedicated preamble was indicated. The UE derives target eNB specific keys and configures the selected security algorithms to be used in the target cell.

10. The target eNB responds with UL allocation and timing advance.

11. When the UE has successfully accessed the target cell, the UE transmits an RRC connection reconfiguration complete (RRCConnectionReconfigurationComplete) message to confirm the handover, along with an uplink buffer status report, whenever possible, to the target eNB to indicate that the handover procedure is completed for the UE. The target eNB verifies the C-RNTI sent in the RRCConnectionReconfigurationComplete message. The target eNB can now begin transmitting data to the UE.

Hereafter, the handover completion procedure will be described.

12. The target eNB transmits a path switch request message to the MME to inform that the UE has changed cell.

13. The MME transmits an update user plane request message to the S-GW.

14. The S-GW switches the downlink data path to the target side. The S-GW transmits one or more end marker packets on the old path to the source eNB and then can release any U-plane/TNL resources towards the source eNB.

15. The S-GW transmits an update user plane response message to the MME.

16. The MME confirms the path switch request message with a path switch acknowledge message.

17. By transmitting a UE context release message, the target eNB informs success of the handover to the source eNB and triggers the release of resources by the source eNB. The target eNB transmits this message after the path switch acknowledge message is received from the MME.

18. Upon receiving the UE context release message, the source eNB can release radio and C-plane related resources associated to the UE context. Any ongoing data forwarding may continue.

Device-to-device (D2D) connection is described below.

The D2D connection is a connection between one master UE (M-UE) and one slave UE (S-UE). That is, the D2D connection is a direct connection between UEs. The M-UE may control the D2D connection with the S-UE autonomously (i.e. UE autonomous mode) or under full/partial control of an E-UTRAN (i.e. E-UTRAN planned mode). One M-UE may configure zero, one or more D2D connections. Different D2D connections may be established with different S-UEs.

The E-UTRAN may configure following two D2D modes in a cell. Only one D2D mode may be configured for a specific cell, for a specific M-UE, for a specific S-UE, or for a specific D2D connection between one M-UE and one S-UE.

1) E-UTRAN planned mode: The E-UTRAN (i.e. eNodeB (eNB) serving the M-UE called 'serving eNB') is responsible for maintaining D2D connection (in terms of radio resource or quality of service (QoS) over D2D connection). The serving eNB has S-UE context for the S-UE connected to the M-UE. A mobility management entity (MME) connected to the serving eNB has S-UE context for the S-UE connected to the M-UE.

2) UE autonomous mode: The M-UE is responsible for maintaining D2D connection (in terms of radio resource or QoS over D2D connection). The serving eNB has no S-UE context for the S-UE connected to the M-UE. The MME connected to the serving eNB may or may not have S-UE context for the S-UE connected to the M-UE.

The S-UE may or may not have an RRC connection with either the serving eNB or another eNB for both modes.

In addition, a D2D hybrid mode may be defined. In the D2D hybrid mode, both the UE autonomous mode and the E-UTRAN planned mode are used for a single D2D connection between one M-UE and one S-UE. Which mode between the UE autonomous and the E-UTRAN planned mode is used for the D2D connection may depend on QoS of D2D radio bearers between the M-UE and the S-UE. For example, a D2D DRB for voice or video service may be established based on the E-UTRAN planned mode. A D2D DRB for data downloading/uploading service may be established based on the UE autonomous mode. Semi-persistent scheduling (SPS) transmissions over the D2D connection may be configured by the serving eNB in the E-UTRAN Planned Mode. Which mode between the UE autonomous and E-UTRAN planned mode is used for the D2D connection may decided by the serving eNB. When the M-UE makes a D2D connection with the S-UE, the M-UE may transmit information about this D2D connection establishment to the serving eNB. Upon receiving the information from the M-UE, the serving eNB ma inform the M-UE which mode should be configured for this D2D connection among the UE autonomous, the E-UTRAN planned, and the hybrid mode.

Hereinafter, it is assumed that the serving eNB is an eNB serving the M-UE. If the eNB serves the S-UE, but it does not serve the M-UE, the eNB is clearly written as 'S-UE serving eNB' hereinafter. When the S-UE serving eNB is used to express a certain procedure, 'M-UE serving eNB' may be also used.

Followings are identities used for the D2D connection.
M-CRNTI: cell radio network temporary identity (C-RNTI) allocated for the M-UE
S-CRNTI: C-RNTI allocated for the S-UE
S-UE identity: The S-UE identity may correspond to one of an international mobile subscriber identity (IMSI), a system architecture evolution (SAE) temporary mobile subscriber identity (S-TMSI), an S-CRNTI, and a new UE identity allocated to the S-UE. The S-UE identity may be allocated by the M-UE, the M-UE serving eNB, the S-UE serving eNB, or an EPC node such as MME/home location register (HLR).
Followings are channels used for the D2D connection.
D2D downlink: a direction from the M-UE to the S-UE
D2D uplink: a direction from the S-UE to the M-UE
D-BCCH: D2D downlink broadcast control channel used over the D2D connection. The M-UE broadcasts the D-BCCH to one or more S-UEs, e.g. for delivery of D2D system information or helping an S-UE detect another UE for the D2D connection.
D-RACH: D2D uplink random access channel used over the D2D connection. The M-UE may allocate radio resources for the D-RACH. The S-UE may know configuration of the D-RACH by receiving information on the D-BCCH. The S-UE may transmit a preamble or message over the D-RACH to the M-UE, in order to make a connection with the M-UE or in order to transmit data to the M-UE.
D-CCCH: D2D uplink/downlink common control channel used over the D2D connection.
D-DCCH: D2D uplink/downlink dedicated control channel used over the D2D connection.
D2D RB: radio bearer which is established over the D2D connection between the M-UE and the S-UE. A DRB and a SRB may be provided for D2D user data and D2D control info, respectively.

At first, a method for transmitting an indication for mobility of a D2D connection is described.

Figure 10:
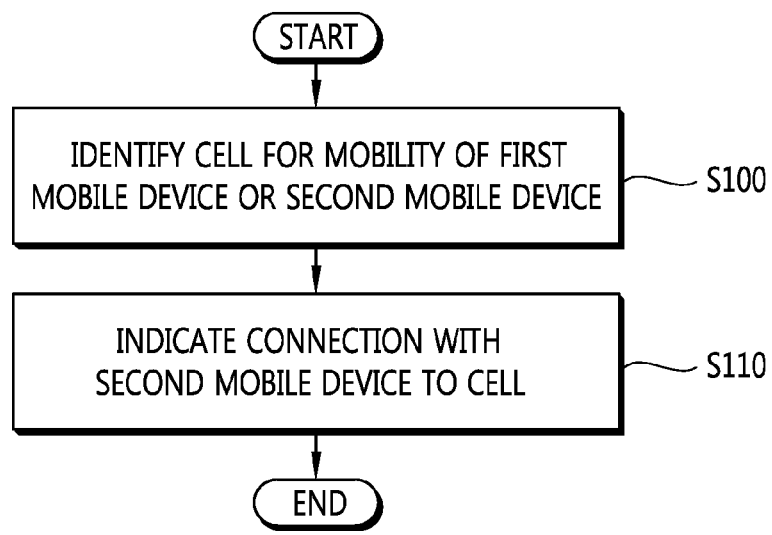
FIG. 10 shows an example of a method for transmitting an indication for mobility of a D2D connection according to an embodiment of the present invention.

FIG. 10 shows an example of a method for transmitting an indication for mobility of a D2D connection according to an embodiment of the present invention.

At step S100, a first mobile device identifies a cell for mobility of the first mobile device or a second mobile device which has a connection with the first mobile device. The first mobile device may be an S-UE, and the second mobile device may an M-UE. The cell for mobility may be identified by itself, or may be identified by a handover command, which is received from a target eNB, which controls the cell, via a serving eNB and the second mobile device.

At step S110, the first mobile device indicates the connection with the second mobile device to the cell. The connection with the second mobile device may be indicated by an establishment cause in an RRC connection request message or an RRC connection setup complete message. Further, the RRC connection request message or the RRC connection setup complete message includes an identity of the first mobile device.

Further, the first mobile device may release the connection with the second mobile device. The first mobile device may release the connection with the second mobile device by itself or by a command. The first mobile device may transmits a D2D connection release request message, including information on the cell for mobility and the connection with the second mobile device, to the second mobile device. The first mobile device may receive a D2D connection release message, including redirection information indicating redirected carrier frequency or redirected cell, from the second mobile device.

Meanwhile, in FIG. 10, the first mobile device moves from the second mobile device which has the D2D connection with the first device, to the cell which has the RRC connection with the first mobile device. However, embodiments of the present invention are not limited thereto, and the cell may be a third mobile device. That is, the first mobile device may move from the second mobile device which has the D2D connection with the first device, to the third mobile device which has another D2D connection with the first mobile device.

Figure 11:
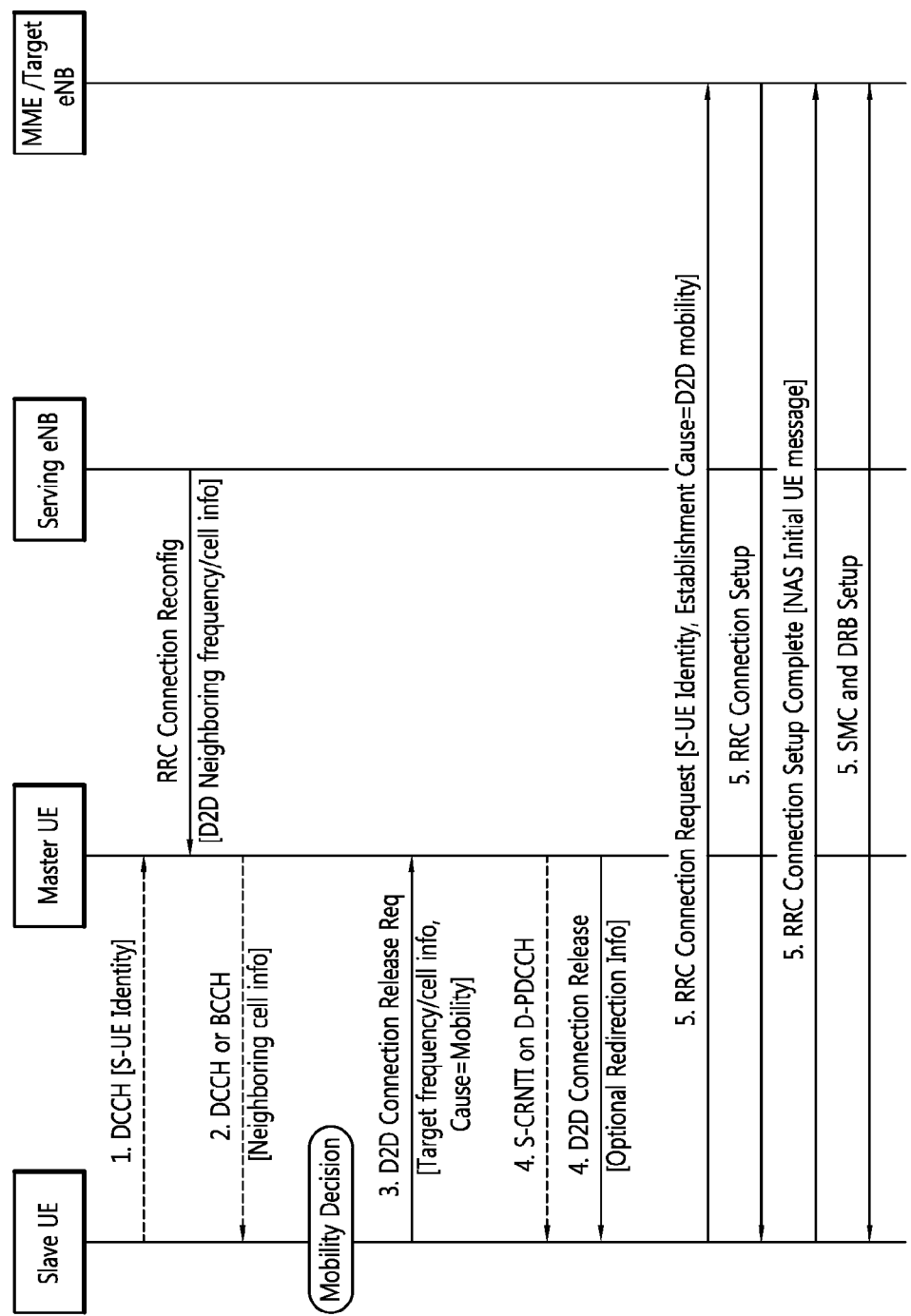
FIG. 11 shows an example of D2D mobility from an M-UE to a target eNB in a UE autonomous mode according to an embodiment of the present invention.

FIG. 11 shows an example of D2D mobility from an M-UE to a target eNB in a UE autonomous mode according to an embodiment of the present invention.

1. The S-UE identity may be allocated to the S-UE by the M-UE, the serving eNB or an EPC node such as MME/HLR. If the S-UE is connected to the M-UE, the S-UE may inform the M-UE about the S-UE identity, particularly in case that the S-UE identity is allocated by the S-UE serving eNB or the EPC node.

2. The serving eNB may inform the M-UE about neighboring cell information, such as carrier frequencies and cell identities of neighboring cells. The M-UE may share this neighboring cell information with one or more S-UEs via a BCCH or a DCCH. UEs may use this information to make connections with eNBs.

3. If the S-UE finds a suitable cell and should establish an RRC connection, rather than D2D connection, the S-UE may transmits a D2D connection release request message to the M-UE for D2D connection in the UE autonomous mode. The D2D connection release request message includes information on target frequency/cell and a release cause set to 'mobility'.

4. If the M-UE decides to release D2D connection e.g. after receiving the D2D connection release request from the S-UE, the M-UE transmits a D2D connection release message to the S-UE. The D2D connection release message may include redirection information indicating redirected carrier frequency or redirected cell. The S-UE may perform cell reselection based on the redirection information.

5. If the S-UE selects a cell, the S-UE may transmit an RRC connection request message to the target eNB controlling the selected cell. The RRC connection request message or the RRC connection setup complete message may include the S-UE identity as UE identity and an establishment cause indicating D2D mobility. Afterwards, the target eNB performs security activation via a security mode command procedure and sets up DRBs.

Figure 12:
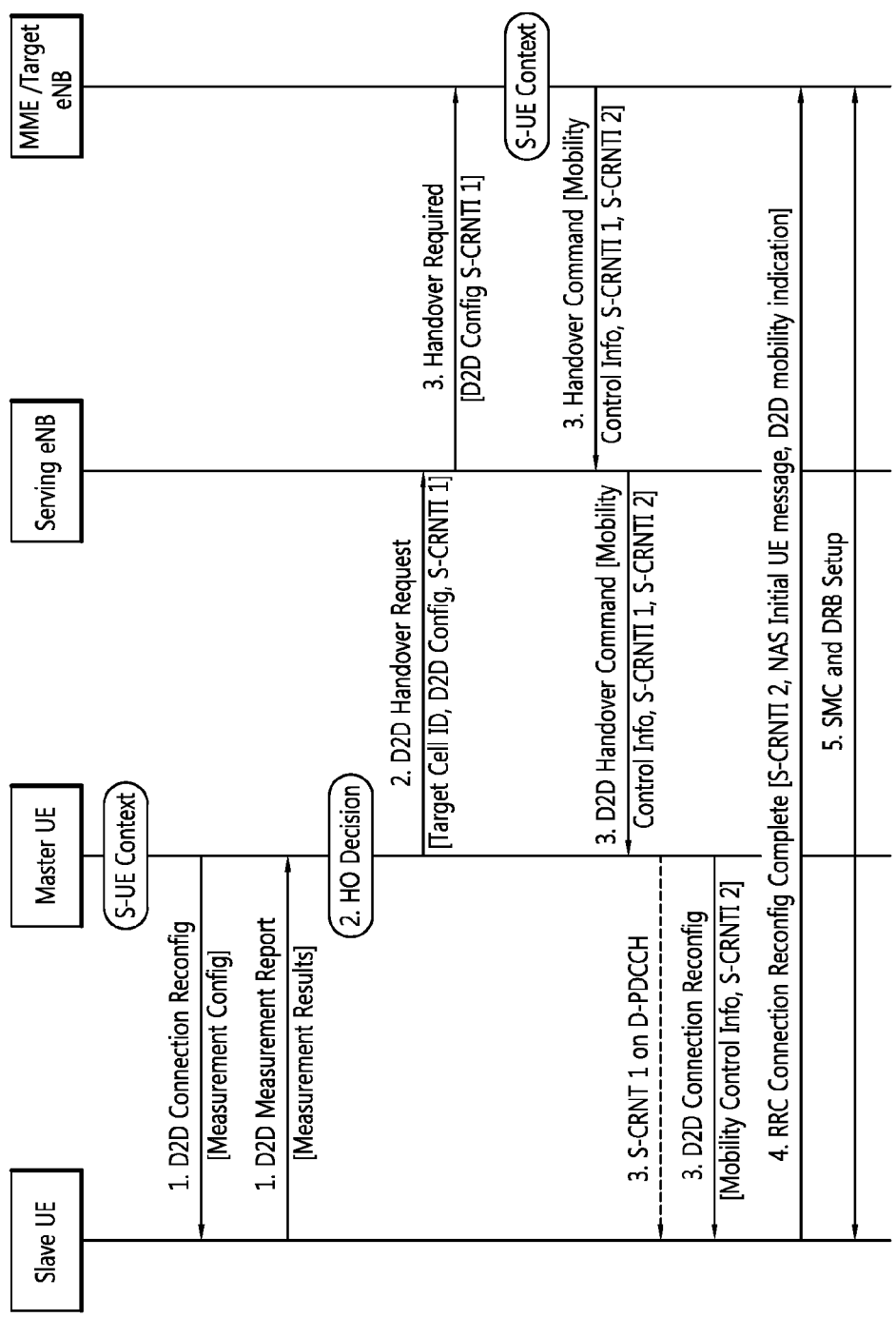
FIG. 12 shows another example of D2D mobility from an M-UE to a target eNB in a UE autonomous mode according to an embodiment of the present invention.

FIG. 12 shows another example of D2D mobility from an M-UE to a target eNB in a UE autonomous mode according to an embodiment of the present invention.

1. The M-UE may configure measurement on neighboring cells or neighboring D2D UEs via a D2D connection reconfiguration message. Based on the D2D measurement configuration, the S-UE performs measurement on neighboring cells and then may report measurement results including quality of received signals from neighboring cells or neighboring D2D UEs via a D2D measurement report message.

2. For D2D connection in the UE autonomous mode, the M-UE may make decision on handover of the S-UE to the target eNB, e.g. based on the measurement report. If the M-UE makes handover decision, the M-UE transmits a D2D handover request message to the serving eNB. The D2D handover request message includes a target cell ID, a D2D configuration used for the D2D connection between the M-UE and the S-UE, and an S-UE identity, e.g. S-CRNTI1.

3. For handover, the serving eNB transmits a handover required message including the D2D configuration and the S-CRNTI1 to the MME. Then the MME transmits a handover request to the target eNB. If the target eNB accepts the handover request, the target eNB transmits a handover command message to the serving eNB via the MME. The handover command message includes mobility control information, an S-UE identity for the D2D connection (S-CRNTI1) and an S-UE identity allocated by the target eNB (S-CRNTI2). The handover command message is transported to the S-UE via the serving eNB and the M-UE.

4. After receiving the handover command message, the S-UE transmits an RRC connection reconfiguration complete (or handover complete) message to the target eNB. The handover complete message includes the S-CRNTI2, a D2D mobility indication, and a NAS initial UE message. The D2D mobility indication informs the target eNB that this handover corresponds to D2D handover. The NAS Initial UE message such as a service request is transported to the MME. Afterwards, the target eNB performs security activation via a security mode command procedure and sets up DRBs.

Figure 13:
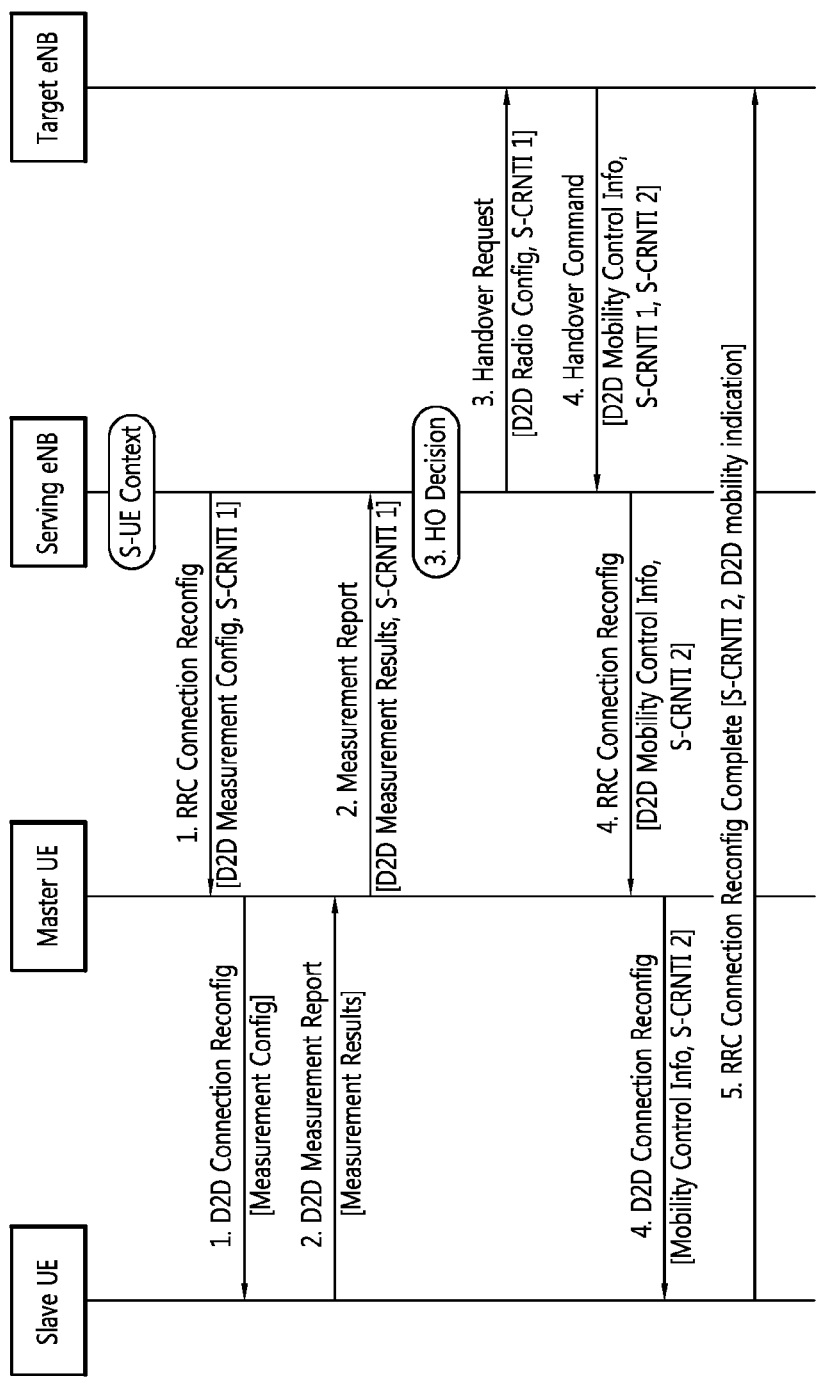
FIG. 13 shows an example of D2D mobility from an M-UE to a target eNB in an E-UTRAN planned mode according to an embodiment of the present invention.

FIG. 13 shows an example of D2D mobility from an M-UE to a target eNB in an E-UTRAN planned mode according to an embodiment of the present invention.

1. The serving eNB may configure a D2D measurement on neighboring cells or neighboring D2D UEs via an RRC connection reconfiguration message transmitted to the M-UE. The D2D measurement configuration is transferred from the M-UE to the S-UE.

2. Based on the D2D measurement configuration, the S-UE performs measurement on neighboring cells and then may report measurement results including quality of received signals from neighboring cells or neighboring D2D UEs via a D2D measurement report message transmitted to the M-UE. The D2D measurement report message is transported from the M-UE to the serving eNB 3. For D2D connection in the E-UTRAN planned mode, the serving eNB may make decision on handover of the S-UE to the target eNB, e.g. based on the measurement report. If the serving eNB makes handover decision, the serving eNB transmits a D2D handover request message to the target eNB. The D2D handover request message includes a target cell ID, a D2D radio configuration used for the D2D connection between the M-UE and the S-UE, and an S-UE identity, e.g. S-CRNTI1.

4. If the target eNB accepts the handover request, the target eNB transmits a handover command message to the serving eNB. The handover command message includes mobility control information, an S-UE identity for the D2D connection (S-CRNTI1) and an S-UE identity allocated by the target eNB (S-CRNTI2). The handover command message is transported to the S-UE via the serving eNB and the M-UE.

5. After receiving the D2D connection reconfiguration message, the S-UE transmits an RRC connection reconfiguration complete (or handover complete) message to the target eNB. The handover complete message includes the S-CRNTI2, and a D2D mobility indication. The D2D mobility indication informs the target eNB that this handover corresponds to D2D handover.

Figure 14:
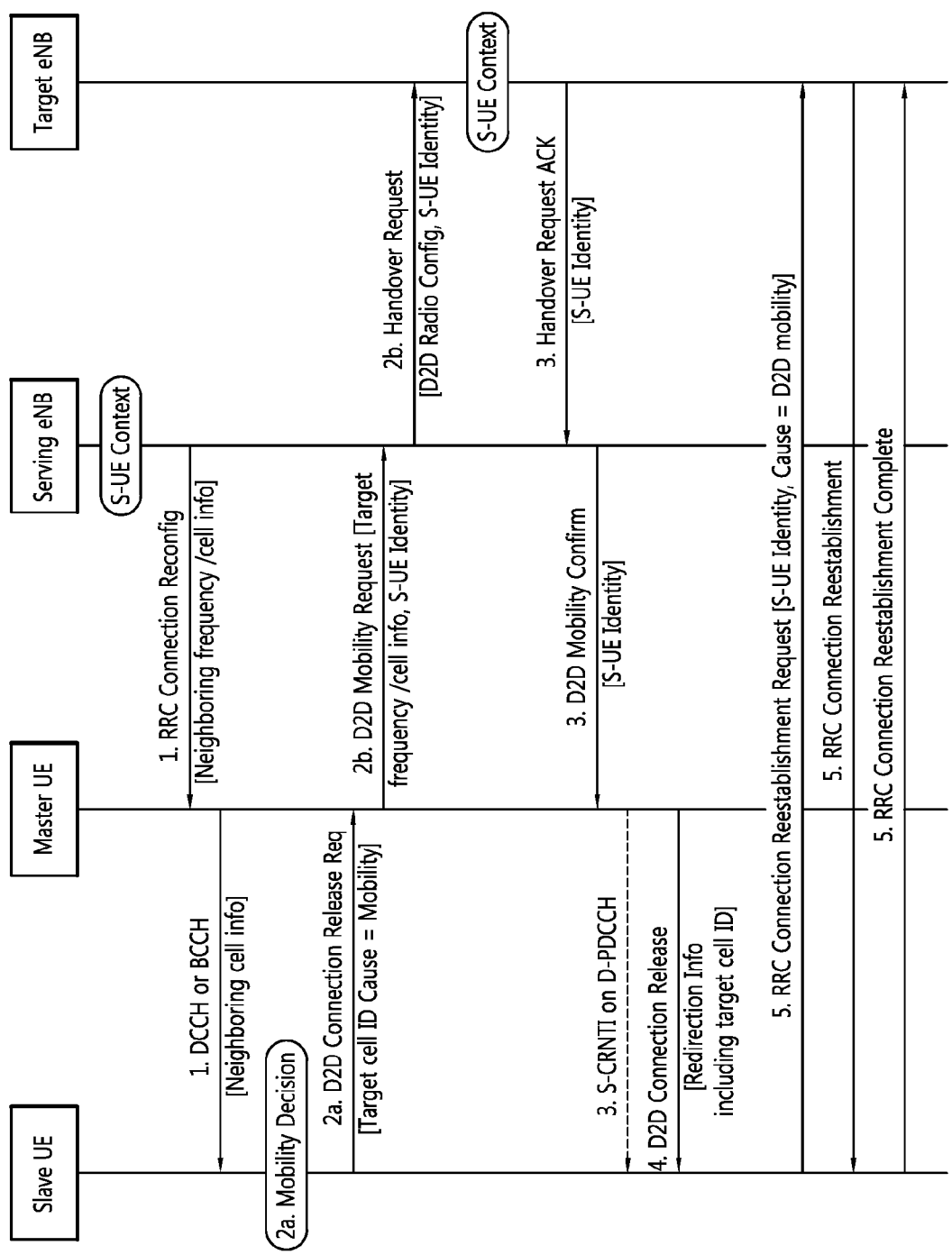
FIG. 14 shows another example of D2D mobility from an M-UE to a target eNB in an E-UTRAN planned mode according to an embodiment of the present invention.

FIG. 14 shows another example of D2D mobility from an M-UE to a target eNB in an E-UTRAN planned mode according to an embodiment of the present invention.

1. The serving eNB may inform the M-UE of neighboring cell information, such as carrier frequencies and cell identities of neighboring cells. The M-UE may share this neighboring cell information with one or more S-UEs via a BCCH or a DCCH. UEs may use this information to make connections with eNBs.

2a. If the S-UE finds a suitable cell and should establish an RRC connection, rather than D2D connection, the S-UE may transmits a D2D connection release request message to the M-UE for D2D connection. The D2D connection release request message includes information on target frequency/cell and release cause set to 'mobility'.

2b. For D2D connection in the E-UTRAN planned mode, upon reception of the D2D connection release request message, the M-UE transmits a D2D mobility request message including the target frequency/cell information and an S-UE identity to the serving eNB. The serving eNB finds the target eNB based on the target frequency/cell information, and then transmits a handover request message to the target eNB. The handover request message includes a D2D radio configuration used for the D2D connection between the M-UE and the S-UE, and the S-UE Identity, e.g. S-CRNTI1.

3. If the target eNB accepts this mobility, the target eNB transmits a handover request acknowledge (ACK) message to the serving eNB, and then the serving eNB transmits a D2D mobility confirm message including the S-UE identity to the M-UE.

4. After receiving the D2D mobility confirm message from the serving eNB, the M-UE transmits a D2D connection release message to the S-UE. The D2D connection release message may include redirection information indicating redirected carrier frequency or redirected cell. The redirection information may include a target cell ID. The S-UE may perform cell reselection based on the redirection information.

5. If the S-UE selects a cell, the S-UE may transmit an RRC connection reestablishment request message to the target eNB controlling the selected cell. The RRC connection reestablishment request message or the RRC connection reestablishment complete message may include the S-UE identity and a reestablishment cause indicating D2D mobility.

Secondly, a method for transmitting an indication for failure of a D2D connection is described.

Figure 15:
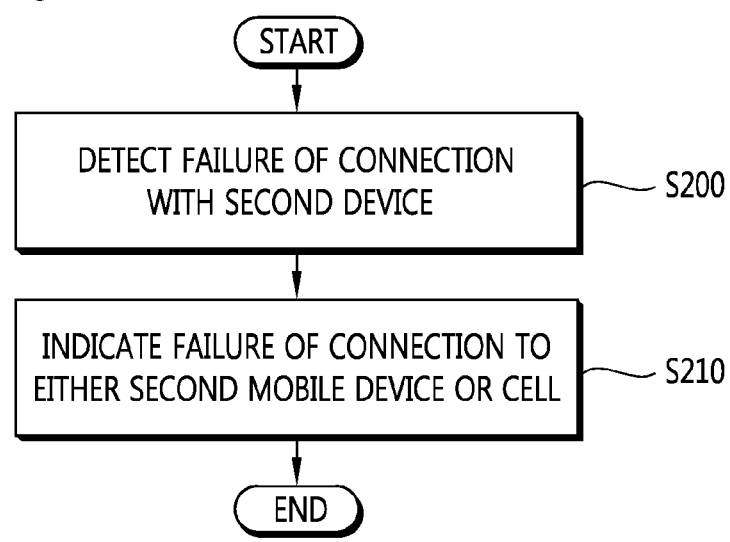
FIG. 15 shows an example of a method for transmitting an indication for failure of a D2D connection according to an embodiment of the present invention.

FIG. 15 shows an example of a method for transmitting an indication for failure of a D2D connection according to an embodiment of the present invention.

At step S200, a first mobile device detects failure of a connection with a second mobile device. At step S210, the first mobile device indicates the failure of the connection with the second mobile device to either the second mobile device or a cell. The failure of the connection with the second mobile device may be indicated by an establishment cause in a radio resource control (RRC) connection request message or an RRC connection reestablishment request message. Further, the RRC connection request message or the RRC connection reestablishment request message may include an identity of the first mobile device.

Further, the first mobile device may transmit an RRC connection setup complete message or an RRC connection reestablishment complete message. The RRC connection setup complete message or the RRC connection reestablishment complete message may include an identity of the second mobile device and an identity of a cell of the first mobile device.

Figure 16:
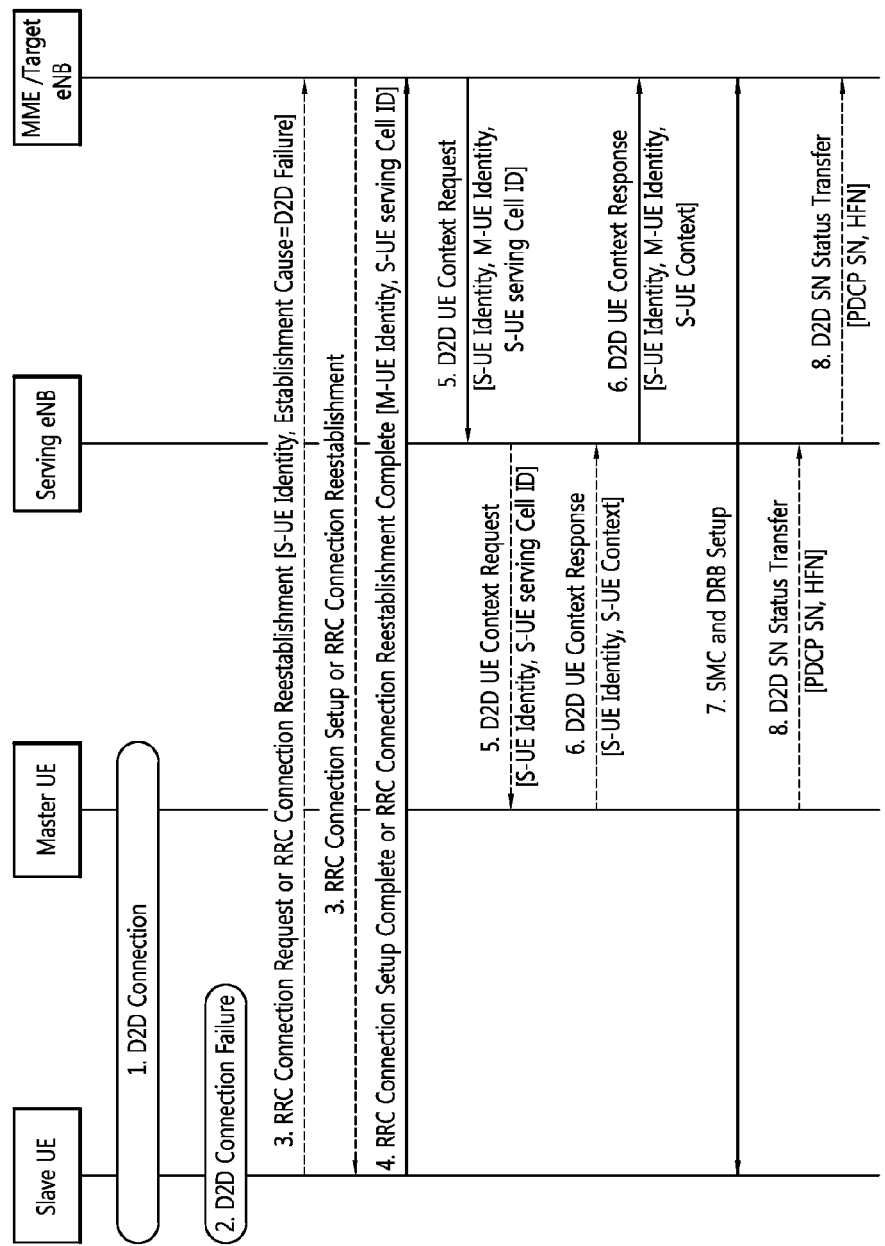
FIG. 16 shows an example of a D2D connection failure handling according to an embodiment of the present invention.

FIG. 16 shows an example of a D2D connection failure handling according to an embodiment of the present invention.

1. D2D connection between the S-UE and the M-UE may be disconnected, e.g. due to bad channel condition. In this case, the S-UE detects D2D connection failure and starts a timer. After the D2D connection failure, the S-UE may perform cell selection/reselection and also try to recover D2D connection with the M-UE.

2. If the S-UE cannot re-establish the D2D connection until the timer is expired, the S-UE releases the D2D connection.

3. Then, if the S-UE finds a suitable cell and should establish an RRC connection, the S-UE may transmit an RRC connection request message or an RRC connection reestablishment request message to the target eNB controlling the selected cell. The RRC connection request message or the RRC connection reestablishment request message may include an S-UE identity as UE identity and an establishment cause indicating D2D failure.

4. During the RRC connection establishment or the RRC connection reestablishment, the S-UE may transmit an RRC connection setup complete message or an RRC connection reestablishment complete message to the target eNB. The RRC connection setup complete message or the RRC connection reestablishment complete message may include an M-UE identity and an S-UE serving cell ID.

5. If the S-UE serving cell ID is received in the RRC connection setup complete message or the RRC connection reestablishment complete message, the target eNB transmits a D2D UE context request message to the serving eNB. The D2D UE context request message includes the S-UE identity, the M-UE identity and the S-UE serving cell ID. If the serving eNB has no S-UE context, the D2D UE context request message is transferred to the M-UE.

6. In response to the D2D UE context request message, the M-UE/serving eNB transmits a D2D UE context response message to the target eNB. Then M-UE and the serving eNB release the S-UE context. The D2D UE context response message includes the S-UE Identity, the M-UE Identity and the S-UE context.

7. The target eNB establishes the S-UE context and performs security activation and DRB setup based on the S-UE context.

8. The serving eNB or the M-UE may transmit a D2D SN status transfer message to the target eNB to convey the uplink PDCP SN receiver status and the downlink PDCP SN transmitter status for D2D DRB in the E-UTRAN planned mode. This message may be also used for any other D2D mobility procedure.

Figure 17:
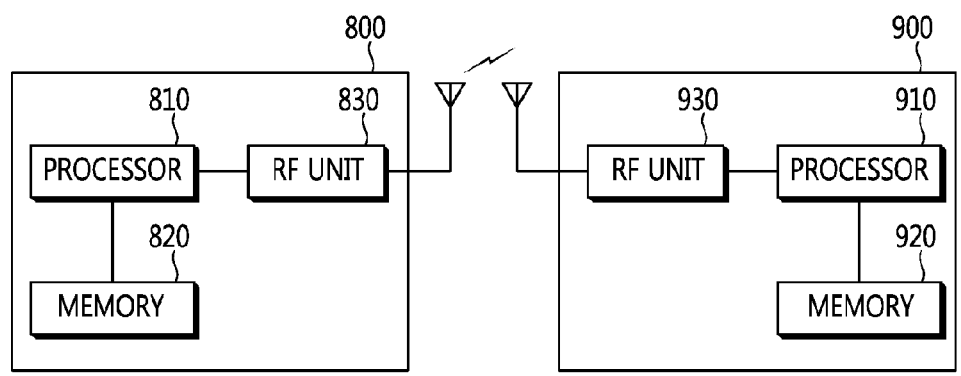
FIG. 17 is a block diagram showing wireless communication system to implement an embodiment of the present invention.

FIG. 17 is a block diagram showing wireless communication system to implement an embodiment of the present invention.

An eNB 800 may include a processor 810, a memory 820 and a radio frequency (RF) unit 830. The processor 810 may be configured to implement proposed functions, procedures and/or methods described in this description. Layers of the radio interface protocol may be implemented in the processor 810. The memory 820 is operatively coupled with the processor 810 and stores a variety of information to operate the processor 810. The RF unit 830 is operatively coupled with the processor 810, and transmits and/or receives a radio signal.

A UE 900 may include a processor 910, a memory 920 and a RF unit 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The RF unit 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The RF units 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

The invention claimed is:

1. A method for transmitting, by a first mobile device, an indication in a wireless communication system, the method comprising:
   identifying a cell for mobility of the first mobile device or a second mobile device which has a connection with the first mobile device; and
   indicating the connection with the second mobile device to the cell,
   wherein the connection with the second mobile device is indicated by an establishment cause included in a radio resource control (RRC) connection request message or an RRC connection setup complete message.

2. The method of claim 1, wherein the cell for mobility is identified by a handover command.

3. The method of claim 2, wherein the handover command is received from a target eNodeB (eNB), which controls the cell, via a serving eNB and the second mobile device.

4. The method of claim 1, wherein the RRC connection request message or the RRC connection setup complete message includes an identity of the first mobile device.

5. The method of claim 1, further comprising:
   receiving a D2D measurement configuration from the second mobile device; and
   transmitting a D2D measurement report to the second mobile device.

6. The method of claim 1, further comprising:
   transmitting a D2D connection release request message, including information on the cell for mobility and the connection with the second mobile device, to the second mobile device.

7. The method of claim 1, further comprising:
   receiving a D2D connection release message, including redirection information indicating redirected carrier frequency or redirected cell, from the second mobile device.

8. A method for transmitting, by a first mobile device, an indication in a wireless communication system, the method comprising:
   detecting failure of a connection with a second mobile device; and
   indicating the failure of the connection with the second mobile device to either the second mobile device or a cell,
   wherein the failure of the connection with the second mobile device is indicated by an establishment cause included in a radio resource control (RRC) connection request message or an RRC connection reestablishment request message.

9. The method of claim 8, wherein the RRC connection request message or the RRC connection reestablishment request message includes an identity of the first mobile device.

10. The method of claim 8, further comprising:
    transmitting an RRC connection setup complete message or an RRC connection reestablishment complete message.

11. The method of claim 10, wherein the RRC connection setup complete message or the RRC connection reestablishment complete message includes an identity of the second mobile device and an identity of a cell of the first mobile device.

* * * * *